G. AND P. TOWNILL AND G. SAMPSON.
VEHICLE HUB WRENCH.
APPLICATION FILED MAR. 19, 1920.
1,351,354.
Patented Aug. 31, 1920.
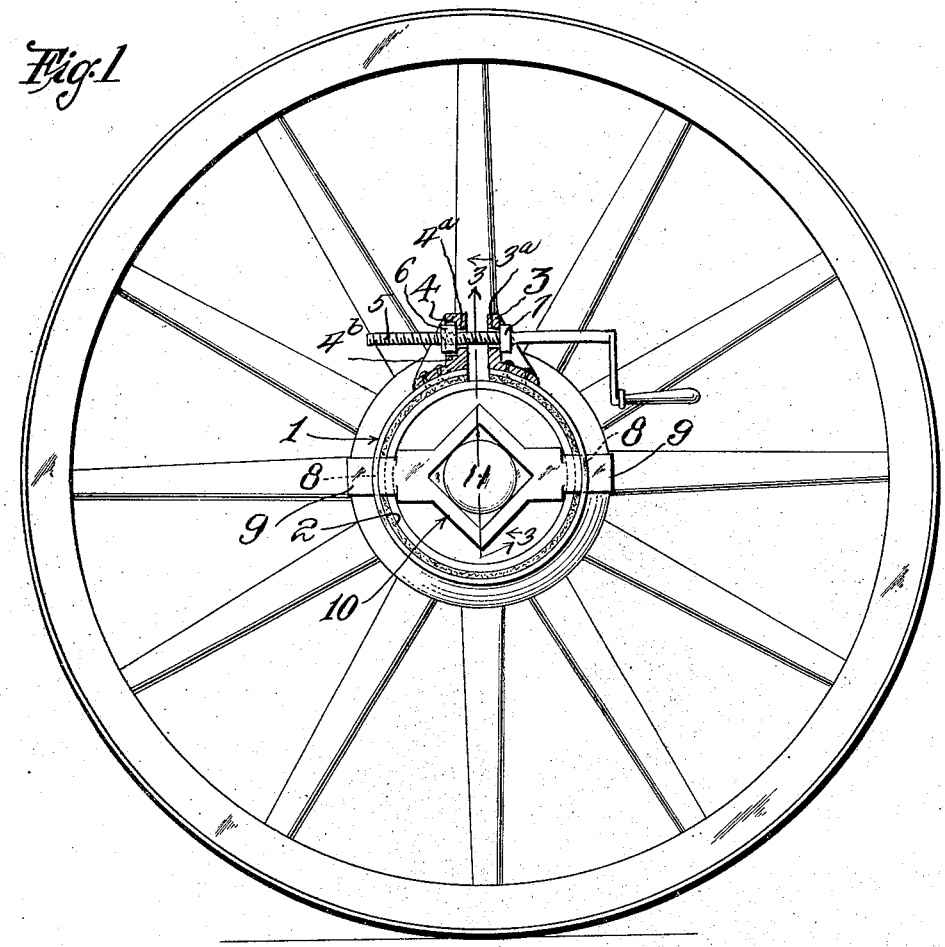
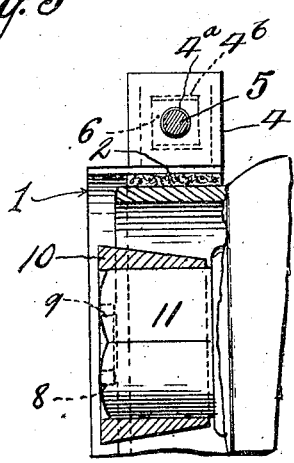
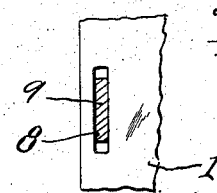

UNITED STATES PATENT OFFICE.

GEORGE TOWNILL, PETER TOWNILL, AND GEORGE SAMPSON, OF PLAINFIELD, ILLINOIS.

VEHICLE-HUB WRENCH.

1,351,354.   Specification of Letters Patent.   Patented Aug. 31, 1920.

Application filed March 19, 1920. Serial No. 367,030.

*To all whom it may concern:*

Be it known that we, GEORGE TOWNILL, PETER TOWNILL, and GEORGE SAMPSON, citizens of the United States, residing at Plainfield, in the county of Will, State of Illinois, have invented a new and useful Vehicle-Hub Wrench; and we do hereby declare the following to be a full, clear, and exact description of the invention, such as will enable others skilled in the art to which it appertains to make and use the same.

The invention relates to a wrench adapted to be connected to the hub of a wagon or vehicle wheel by which the nut on the axle may be easily rotated and unscrewed by simply rotating the wheel when it is desired to remove the wheel from the axle.

One of the objects of the invention is to provide a simple, efficient and inexpensive device of this character adapted to be readily applied to and disengaged from said hub.

Another object of the invention is to provide a device of this character having means for adjusting the same to hubs of various sizes.

Another object of the invention is to provide a device of this character provided with a band or collar adapted to be clamped on the periphery of the hub, said band or collar having slots at each end adapted to receive the outer ends of a wrench, the slots being longer than the width of the ends affording a measure of adjustability.

With the above and other objects in view the invention comprises further features and combination of parts as hereinafter set forth, shown in the drawings, described and claimed, it being understood that changes in the precise embodiment of the invention may be made within the scope of what is claimed without departing from the spirit of the invention.

In the drawings:—

Figure 1 is a view in elevation of a hub wrench applied to the hub of a wheel.

Fig. 2 is a detail view of a portion of the band slots.

Fig. 3 is a sectional view through a portion of the hub wrench and a portion of the hub taken on line 3—3 of Fig. 1.

Referring to the drawings, the numeral 1 designates a metallic band or collar which is provided with an inner lining of fiber, rubber or other suitable material for causing the band or collar to frictionally engage the hub of a wheel when the clamp is applied thereto. The band or collar is provided with lugs 3 and 4, which are rigidly connected to the ends thereof. The lugs 3 and 4 are provided with suitable apertures $3^a$ and $4^a$ registering with each other and adapted to receive a screw threaded bolt 5, said apertures being preferably larger than the bolt 5 so as to allow play. The lug 4 is provided with a screw threaded nut 6, which is disposed in a rectangular shaped recess $4^b$, larger than the nut 6 so as to allow a limited amount of play but not large enough to allow the nut to rotate. The bolt 5 is provided with a shoulder 7, which forces the lug 3 in the direction of the lug 4 when the bolt 5 is rotated.

The band or collar 1 is provided with slots 8 on each side thereof adapted to receive the outer ends 9 of the socket wrench 10, which wrench receives the nut 11 of the axle.

It will be observed that the slots 8 are of greater length than the width of the ends 9 of the socket wrench so that the wrench may readily adjust itself centrally in relation to the clamp and hub thereby accommodating the clamp to various diameters of hubs.

The operation of the device is as follows. The device is applied to the hub as shown in Fig. 1 of the drawings and the bolt 5 is then rotated until the collar 1 is caused to rigidly clamp the periphery of the hub. The spokes of the wheel are then grasped and rotated which action causes the nut 11 on the axle to be unscrewed.

It will be seen that this invention is simple, efficient and durable and that the same will greatly facilitate the removal of a nut from the axle, and that the same can be readily restored in the same manner.

The invention having been set forth what is claimed as new and useful is:—

A hub wrench for removing axle nuts comprising a flexible band, the ends of said band being spaced apart, lugs carried by the ends of the band, a threaded bolt passing through apertures in said lugs, a rectangular shaped nut threaded on said threaded bolt and disposed in a recess of one of the lugs, a shoulder carried by the threaded bolt and engaging the outer face of the other lug, means whereby said bolt may be rotated to draw the lugs together and clamp the band on a hub, there being diametrically disposed apertures in the flexible band, a socket wrench provided with oppositely disposed arms, said arms being slidably mounted in the diametrically disposed apertures so that said socket wrench will assume a substantially central position for the reception of axle nuts when the clamping band is applied to various sizes of hubs.

In testimony whereof we have signed our names to this specification in the presence of two subscribing witnesses.

GEORGE TOWNILL.
PETER TOWNILL.
GEORGE SAMPSON.

Witnesses:
FRANK SHARPE,
JOHN H. FEDDYMERT.